(12) United States Patent
Shah et al.

(10) Patent No.: US 7,490,870 B2
(45) Date of Patent: Feb. 17, 2009

(54) HYDRAULIC FLANGE CONNECTION

(75) Inventors: Atul Shah, Mentor, OH (US); Daniel A. Waina, Mentor, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 501 days.

(21) Appl. No.: 11/365,417

(22) Filed: Mar. 1, 2006

(65) Prior Publication Data

US 2006/0244261 A1 Nov. 2, 2006

Related U.S. Application Data

(60) Provisional application No. 60/676,660, filed on Apr. 29, 2005.

(51) Int. Cl.
*F16L 13/14* (2006.01)
(52) U.S. Cl. .................. 285/382.4; 285/382; 285/405
(58) Field of Classification Search .............. 285/382.4, 285/382, 405, 363
See application file for complete search history.

(56) References Cited

U.S. PATENT DOCUMENTS

| | | | | |
|---|---|---|---|---|
| 660,862 | A | * | 10/1900 | Lovekin ................ 285/382.4 |
| 1,573,103 | A | * | 2/1926 | Tomlinson ............. 285/382.4 |
| 1,925,937 | A | * | 9/1933 | Schultis ................ 285/382.4 |
| 2,303,311 | A | * | 11/1942 | Gredell ................. 285/382.4 |
| 2,545,930 | A | | 3/1951 | Richardson |
| 2,613,958 | A | | 10/1952 | Richardson |
| 3,263,476 | A | | 8/1966 | Hinderer |
| 4,845,972 | A | | 7/1989 | Takeuchi et al. |
| 4,980,961 | A | | 1/1991 | Caudill |
| 5,283,951 | A | | 2/1994 | Davenport et al. |

FOREIGN PATENT DOCUMENTS

| | | |
|---|---|---|
| EP | 0272511 A2 | 6/1988 |
| SU | 867468 | 9/1981 |

OTHER PUBLICATIONS

Lehydraulics Leading Edge Hydraulics, one page printout for "Mechanically Formed 4-Bolt Flange Connections".
Lorine Manufacturing 4 page brochure entitled "Metal Tubing Fabricators".
Notification of Transmittal of The International Search Report and The Written Opinion of the International Searching Authority, or the Declaration in corresponding International Application No. PCT/US2006/013951.

* cited by examiner

*Primary Examiner*—David E Bochna
(74) *Attorney, Agent, or Firm*—John A. Molnar

(57) ABSTRACT

A hydraulic flange connection having a formed tube in physical conjointness with a contoured sleeve member, the conjointness including the sleeve member having a cylindrical body bore, a cylindrical outer portion tapering at one axial end into a frustoconical portion abutting one bore end, the cylindrical outer portion also merging into an annular outer end surface having inner and outer edges defining a bowl-shaped recess with a raised annular inner end surface; the tube having a cylindrical portion extending into and through the sleeve member bore, a radial flange portion thereof including an axially outwardly-directed, openly curved, circumferential radial groove, with an inner surface of the flange portion conforming axially and radially with an abutting complementary surface of the bowl-shaped outer recess portion in a fully nesting retention relationship. Details of achieving the conjointness between the tube and the sleeve member are also set forth in product-by-process claim recitation.

16 Claims, 4 Drawing Sheets

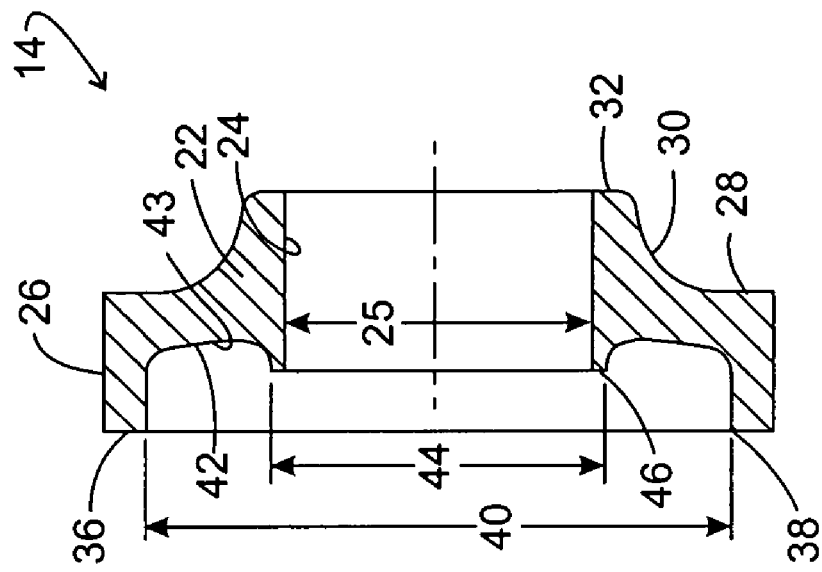

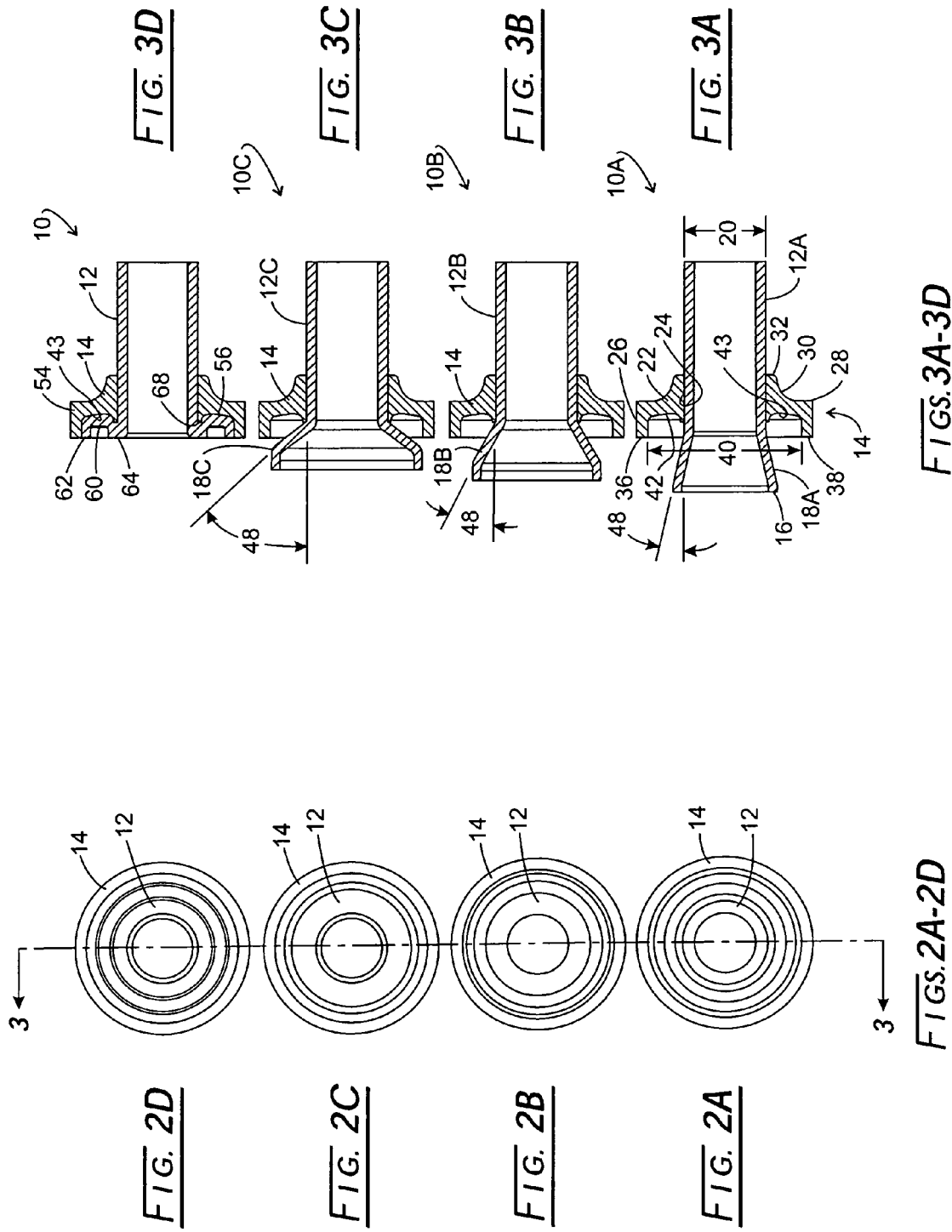

HYDRAULIC FLANGE CONNECTION

CROSS-REFERENCE TO RELATED CASES

The present application claims the benefit of the filing date of U.S. Provisional Application Ser. No. 60/676,660, filed Apr. 29, 2005, the disclosure of which is incorporated herein by reference.

FIELD OF THE INVENTION

The present invention pertains to a mechanical flange connection for use between pressurized hydraulic system components having a cylindrical tube member in physical, fixed, conjointness with a contoured sleeve member. More particularly, the details of the conjointness, including the fixed nesting of a contoured radial flange portion of the sleeve member, within a formed, bowl-shaped, open, recess portion of the sleeve member, are set forth.

BACKGROUND OF THE INVENTION

Mechanical connections, such as flanges utilized between pressurized hydraulic system components, are typically completely or monolithically machined from steel bar stock or brazed together from several individual components. In the latter instance, component misalignment, during the assembly process and/or a lack of braze material, will not allow the formation of a homogeneous braze joint which, in turn, can cause component failure. Braze joint gap conditions warrant press/interference fit or slip fit designs, depending upon the specific component materials. Press fit designs require the tubular component to be pressed into the mating component by mechanical means and/or brute force since the tubular component must be deformed below its nominal OD dimension in order to be fitted into the adjoining component as an interference fit between the mating components. This method is not only expensive, but also dependent upon the existence of sufficient brazing material in the braze joint itself.

While a monolithically machined flange eliminates the braze joint drawbacks, the machining process is time consuming due to the required machining of a hole fully through the steel material. In addition, the machining process generates steel chips that require proper environmental disposal.

The patent literature sets forth many examples of flange assemblies and methods for producing same, examples of which include: U.S. Pat. Nos. 2,545,930 and 2,613,958, both to Richardson; U.S. Pat. No. 3,263,476 to Hinderer; U.S. Pat. No. 4,845,972 to Takeuchi; U.S. Pat. No. 4,980,961 to Caudill; U.S. Pat. No. 5,283,951 to Davenport et al.; and USSR Inventor's Certificate No. 867,468 to Kayushin. However, none of these prior art structures and/or methods pertain to the specific structures and methods of the present invention.

SUMMARY OF THE INVENTION

Accordingly, in order to overcome the deficiencies of the prior art mechanisms and processes for making same, the present invention provides an improved mechanical flange connection for use between pressurized hydraulic system components, having a typical cylindrical tube member in fixed, physical conjointness with a contoured sleeve member.

Specifically, in terms of structure, in this invention, a hydraulic flange connection having a formed, generally cylindrical, tube member in permanent physical conjointness with a captive contoured sleeve member, the conjointness including: i. the contoured sleeve member having: a. a body portion having an axial cylindrical bore portion of predetermined diametral and axial extents; b. a cylindrical outer portion, tapering at one axial end and, at an annular step thereof, into a generally conical portion merging into an outer annular end surface substantially perpendicular to and abutting an outer end of the body cylindrical bore portion; and c. the cylindrical outer portion, at another axial end thereof, merging into an annular outer end surface, the latter having an inner circular edge defining the maximum diametral extent of a formed, bowl-shaped, open, annular recess portion, with the minimum diametral extent thereof being defined by a raised annular inner end surface portion, axially recessed relative to the annular outer end surface, with the raised annular inner end surface portion being substantially perpendicular to an abutting inner end of the body cylindrical bore portion; and ii. the generally cylindrical tube member being in permanent physical conjointness with the contoured sleeve member and having: a. a predetermined outer diametral extent and a predetermined wall thickness; b. a tube member cylindrical portion extending into and through the outer end of the body cylindrical bore portion of the sleeve member; c. an upset, radial, integral flange portion on one end thereof and interconnected with the tube member cylindrical portion; d. the radial flange portion including an axially outwardly-directed, open, curved, circumferential, radial groove, with an inner surface of the flange portion conforming to and adjoining a complementary surface of the sleeve member bowl-shaped outer recess portion, both axially and radially; e. the radial flange portion also having spaced, concentric, annular end surfaces in a substantially parallel plane relationship with the sleeve member annular outer end surface; and f. the radial flange portion further including an inner recess portion that envelops the sleeve member raised annular, inner, end surface portion.

In one version thereof, the diametral extent of the body cylindrical bore portion and the tube member outer diametral extent are selected so as permit a slip-fit assembly therebetween.

In another version thereof, the concentric annular end surfaces of the sleeve member flange portion are substantially coplanar with the sleeve member annular outer end surface.

In a further version thereof, the sleeve member bore portion further includes a blind, generally circumferential undercut, extending axially inwardly, for a predetermined extent, from the outer end of the sleeve member axial bore portion.

In a variation of the above version, the tube member cylindrical portion further includes a raised, generally cylindrical, rib portion of a predetermined axial extent.

In another variation of the above version, radial extents and the axial extents of the blind undercut and the raised cylindrical rib portion are substantially similar, with the rib portion being received within the undercut, thereby, in concert with the inner recess portion of the flange portion, at least axially retaining the sleeve member on the tube member.

In a further variation of the above version, at least one of the tube member raised cylindrical rib portion and the sleeve member blind undercut has a slightly asymmetrical and size-interfering external shape, so as the result of an axial force abutment force, forces the rib portion into an asymmetrical interference with the undercut, thereby rendering the sleeve member, both radially as well as axially, immobile relative to the tube member.

In a differing version thereof, the tube member cylindrical portion further includes a raised, further annular, generally cylindrical rib portion of predetermined axial and radial extents, with an outer peripheral surface of the rib portion being asymmetrical relative to the tube member cylindrical portion.

In yet a further version thereof, the sleeve member bore portion further includes a blind peripheral recess extending axially inwardly, for predetermined axial and radial extents, from the outer end of the sleeve member bore portion, with the peripheral surface of the recess being asymmetrical relative to the sleeve member bore portion.

Another embodiment of the present invention pertains to a mechanical flange connection for use between pressurized hydraulic system components having a generally cylindrical tube member in physical conjointness with a contoured sleeve member, the conjointness including: i. the contoured sleeve member having: a. a body portion including an axial cylindrical bore; b. a cylindrical outer portion, tapering at one axial end into a generally frustoconical portion abutting one end of the cylindrical bore; c. the cylindrical outer portion, at another axial end thereof, merging into an annular outer end surface having an inner circular edge defining an outer diameter of a formed, bowl-shaped, open, annular recess portion having an inner diameter defined by a raised annular inner end surface portion, axially recessed, relative to the annular outer end surface, with the raised annular inner end surface portion abutting another end of the cylindrical bore; and ii. the generally cylindrical tube member being in physical conjointness with the contoured sleeve member and having: a. a predetermined outer diameter and a predetermined wall thickness; b. a tube member cylindrical portion extending into one end and through the cylindrical bore; c. a radial, integral flange portion, at one end of the tube member cylindrical portion; d. the radial flange portion including an axially outwardly-directed, openly curved, circumferential radial groove, with an inner surface of the flange portion conforming axially and radially with an abutting complementary surface of the sleeve member bowl-shaped outer recess portion in a nesting relationship; and e. the radial flange portion also including an inner recess portion enveloping the sleeve member raised annular, inner, end surface portion.

In one version thereof, the radial flange portion further includes spaced, concentric, annular end surfaces in substantially parallel plane relationships with the sleeve member annular outer end surface.

In a differing version thereof, the sleeve member bore further includes a blind, circumferential, radial undercut, extending axially inwardly for a predetermined extent.

In a variation of the above version, the tube member cylindrical portion further includes a raised, radial, generally cylindrical boss portion of a predetermined axial extent.

In another variation, the undercut and boss portion radial as well as axial extents are similar thereby permitting nesting therebetween and at least axially retaining the sleeve member on the tube member.

In a differing variation, at least one of the tube member raised cylindrical boss portion and the sleeve member blind recess has an asymmetrical outer shape, resulting in an asymmetrical interference fit therebetween and thus rendering the sleeve member at least radially immobile relative to the tube member.

In a further version, the conjointness between the generally cylindrical tube member and the contoured sleeve member is produced via the process of: a. slip-fitting the tube and sleeve member together into an assembly, with the sleeve member surrounding the tube member; b. extending a predetermined length the tube member from the inner end of the sleeve member cylindrical bore; c. fixedly securing the assembly in a clamp die mechanism; and d. forming, with at least one forming step, via at least one movable punch, the extending sleeve member length into the integral flange portion and nesting same with the sleeve member bowl-shaped outer recess portion. In one variation thereof, the forming step includes multiple sequences.

In another variation thereof, the process further includes pre-shaping a portion of the tube member, corresponding to the extending sleeve member length, into an outwardly tapering shape, prior to the slip-fit assembly of the tube and sleeve members.

In a differing variation thereof, the process further includes pre-shaping a portion of the tube member, so as produce, on an outer peripheral surface portion thereof, a raised, generally cylindrical boss portion of a predetermined axial extent, prior to the slip-fit assembly of the tube and sleeve members. Preferably, in this variation, the process includes the additional sub-step of confining the raised cylindrical boss portion within a blind, generally circumferential, recess within the sleeve member, with the recess extending axially inwardly, for a predetermined extent, from the outer end of the sleeve member axial bore portion, as a part of the slip-fit assembly of the tube and sleeve members.

The previously-described advantages and features, as well as other advantages and features, will become readily apparent from the detailed description of the preferred embodiments that follow.

BRIEF DESCRIPTION OF THE DRAWINGS

FIG. 1A is a longitudinal, central, sectional view of one of the embodiments of the hydraulic flange connection of the present invention.

FIG. 1B is a longitudinal, central, sectional view of the captive sleeve member of FIG. 1A.

FIGS. 2A-2D are successive top plan views of a forming method or process involved in the assembly of the hydraulic flange connection of the present invention.

FIGS. 3A-3D are successive cross sectional views, taken along line 3-3 of FIGS. 2A-2D, respectively.

DETAILED DESCRIPTION OF THE INVENTION

Figure 5:
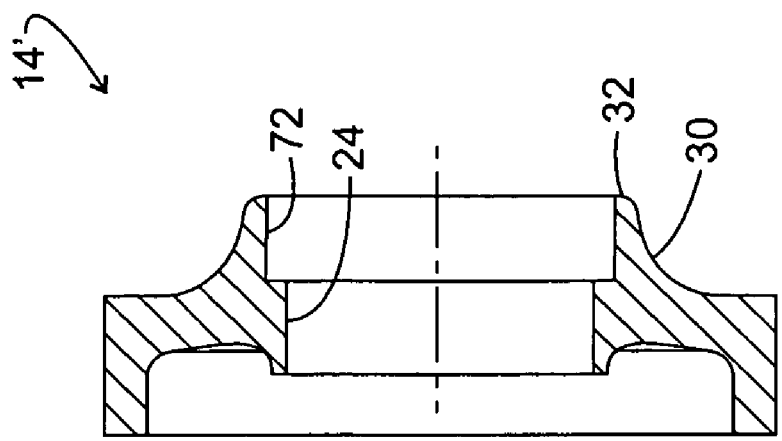
FIG. 5 is a cross sectional view, taken along line 5-5 of FIG. 4.

Referring now to the several drawings, illustrated in FIG. 1A is one embodiment of the completed or fully assembled hydraulic flange connection, of the present invention, generally indicated at 10 that basically includes a formed, generally cylindrical, tube member 12 in physical conjointness with a captive, contoured, sleeve member 14, best seen in FIG. 1B. The assembly of hydraulic flange connection 10 is achieved via either a single forming step or a multi-step forming process or method that is successively set forth, for example, in the manner illustrated in FIGS. 2A-2D, but best understood in the sequence shown in FIGS. 3A-3D.

Specifically, tube member 12 is either fully cylindrical (not shown per se), having an outer diametrical extent 20, or pre-shaped such as via upsetting, so at one end 16 thereof, as to include a generally frusto-conical, outwardly extending, portion 18A, best seen in FIG. 3A. Tube member 12, either cylindrical or having tapered end portion 18A, is then inserted into the central, generally cylindrical, bore portion 24 of a body portion 22 of substantially symmetrical captive sleeve member 14, for further forming, which will be explained in more detail hereinafter.

Captive, contoured, sleeve member 14, as best seen in FIG. 1B, further includes a cylindrical outer portion 26 that tapers, at one end and at an annular step 28, into a generally conical portion 30 that, in turn, merges into an annular outer end surface 32 which is perpendicular to and abuts the outer end of body bore portion 24. Cylindrical outer portion 26, at another end thereof, merges into an outer annular surface 36 which, at its inner circular edge 38 defines the maximum diametral extent 40 of a formed, curved or bowl-shaped annular recess portion 42 and whose minimum diametral extent 44 is defined by a raised annular inner end surface portion 46 that is perpendicular to the inner end of body bore portion 24.

Figure 6:
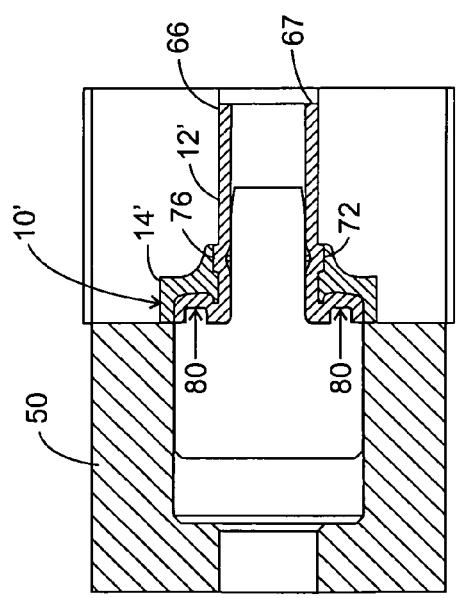
FIG. 6 is a longitudinal cross sectional view of a further embodiment of the hydraulic flange connection of this invention, shown while undergoing a final forming or assembly operation.

The diametral extents 25 and 20 of sleeve member 14 and tube member 12 respectively, are dimensioned so as to permit initial slip fit assembly thereof before placing and securing this assembly 10A, shown in FIG. 3A, into a known clamp die mechanism, similar to the type shown in FIG. 6. Assuming that tube member 12 is still freely fully cylindrical, when a multi-step forming method or process is utilized, a known, first, movable punch (not shown) is used to form initial or first frusto-conical or tapered portion 18A of any desired included angle 48, which in FIG. 3A, for the sake of an illustrated example, is shown at about 10 degrees. Thereafter, as shown in FIG. 3B, another movable punch operation further increases the included angle 48 of tapered portion 18B to about 25 degrees, for example, in assembly 10B. In the FIG. 3C illustration, a known, further, movable punch again increases the included angle 48 of tapered portion 18C, of assembly 10C, to about 50 degrees, for example. Finally, in the FIG. 3D illustration, a known final movable punch, similar to punch 50 of FIG. 6, is utilized to complete assembly 10 by final forming tapered portion 18C of FIG. 3C into a captive flange portion 54 whose inner surface 56 now physically adjoins and corresponds to an inner surface 43 of sleeve member recess portion 42. If so desired, it is also feasible to produce flange connection 10 via but a single forming step, preferably starting with an already preformed tube member 12 that has an initial slightly tapered portion 18A, as illustrated in FIG. 3A, on one end thereof.

Turning now specifically to FIGS. 1A and 3D, they illustrate that, after the completion of the final forming step (from FIGS. 3C to 3D), tube hydraulic flange connection or tube assembly 10 includes tube member 12 having an upset, radial, captive flange portion 54 formed on one end thereof, with radial flange portion 54 further including an axially outwardly-directed, open, curved, circumferential radial groove 60, that results from the previously-noted and explained final forming operation, during which the final movable punch 50 (FIG. 6) essentially forms tube member tapered end portion 18C (FIG. 3C) into flange portion 54 so that its inner surface 56 conforms to the inner surface 43 of sleeve recess portion 42 wherein, in effect, the latter circumferentially contains or cradles flange portion 54. As a result of being integrally formed into recess portion 42, flange portion 54 substantially identically conforms to and adjoiningly mates with sleeve member recess portion 42, both axially and radially, with axial outer surfaces 62 and 64 of flange portion 54 being coplanar with sleeve member annular outer surface 36. As best seen in FIGS. 1A and 3D, flange portion 54 also includes an inner recess portion 68 that envelopes raised annular inner end surface portion 46 of sleeve member 14, thereby aiding in the locking of the latter to tube member 12, particularly its flange portion 54.

Figure 4:
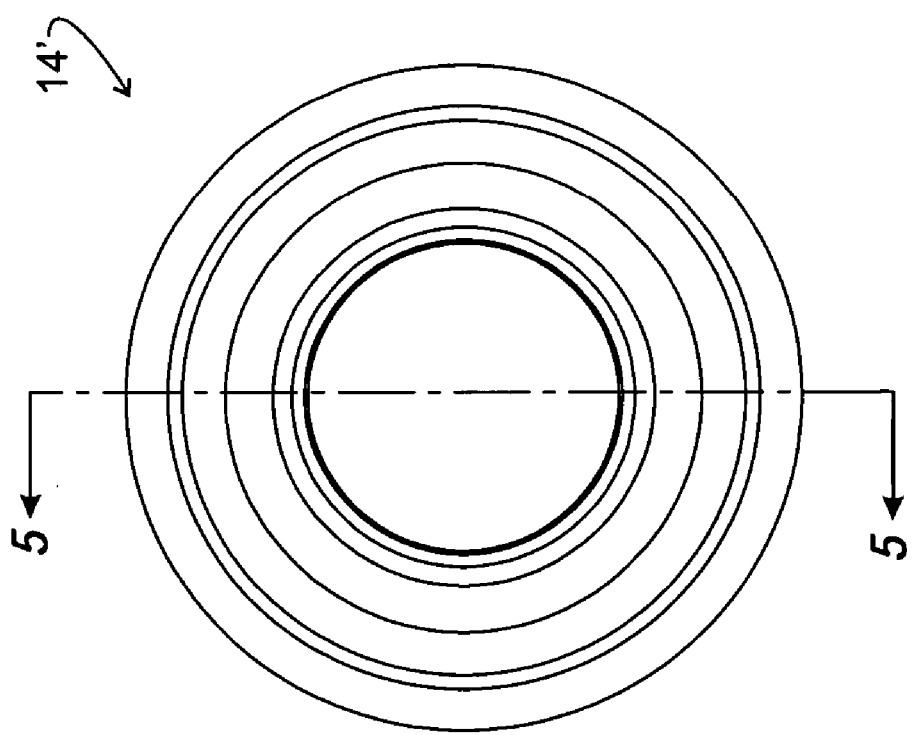
FIG. 4 is a top plan view of a captive flange component of another embodiment of the hydraulic flange connection of the present invention.
Figure 7A:
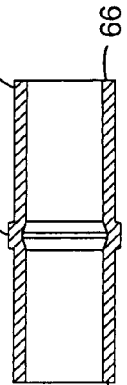
FIGS. 7A-7E are successive cross sectional views of a forming method or process involved in the assembly of the further embodiment of the hydraulic flange connection of FIG. 6.
Figure 7B:
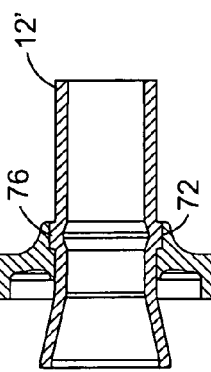
Figure 7C:
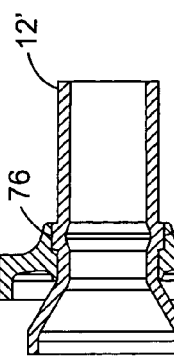
Figure 7D:
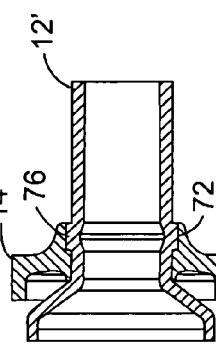
Figure 7E:
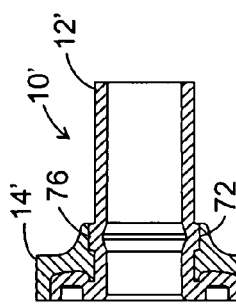

Continuing now with FIGS. 4 and 5, illustrated therein is a modified captive sleeve member 14' which is substantially similar to sleeve member 14 and thus, in the interest of brevity, similar features will not be discussed further. Modified sleeve member 14' includes a radial, blind, recess or undercut 72 that axially extends into sleeve member bore portion 24 at a location radially inwardly of conical portion 30. Recess 72, which is also illustrated in FIGS. 7B and 7E, serves to both axially and radially retain a flat, raised or expanded rib portion 76 of a modified tube member 12' which is also substantially similar to tube member 12 so that, in the interest of brevity, like features will not be discussed again. Raised or expanded rib portion 76 extends radially outwardly from otherwise generally cylindrical tube member 12' in the vicinity of about the middle of its axial extent, as best illustrated in FIG. 7A.

After assembling modified tube member 12' and modified sleeve member 14', in the previously-described slip-fit manner, so that sleeve member expanded rib portion 76 is radially and axially confined in and by sleeve member undercut portion or recess 72, the subsequent sequential forming steps illustrated in FIGS. 7B-7E, are carried out in a manner substantially similar to those illustrated in FIGS. 3A-3D. It is the function of rib portion 76, when located within recess 72, as shown in FIG. 6, to lock captive sleeve member 14', in place, relative to tube member 12', in the manner described.

While not illustrated separately, at least one of undercut portion 72 and rib portion 76 can be shaped slightly differently from that of the other so that an added deformation of raised rib portion 76, such as, for example, via an axial force abutment such as by movable punch 50, shown schematically by arrows 80 (FIG. 6) upon flange portion 54 of tube member 12' whose other end 66 is confined against axial movement at 67, further protrudes rib portion 76 into cavity 72, thereby making captive sleeve member 14' immobile relative to tube member 12'.

Finally, it should be understood that the material selection aspects of this invention are of course predicated upon the minimum material elongation requirements, generally of 25% or greater that allow tube members 12 and 12' to be satisfactorily formed. It should be clear at this time that the resulting flange connections and the methods for achieving same, of the present invention, achieve same with greater accuracy and at a lower cost.

It is deemed that one of ordinary skill in the art will readily recognize that the several embodiments of the present invention fill remaining needs in this art and will be able to affect various changes, substitutions of equivalents and various other aspects of the invention as described herein. Thus, it is intended that the protection granted hereon be limited only by the scope of the appended claims and their equivalents.

What is claimed is:

1. A hydraulic flange connection having a formed, generally cylindrical, tube member in permanent physical conjointness with a captive contoured sleeve member, said conjointness including:
    i. said contoured sleeve member including:
        a. a body portion having an axial cylindrical bore portion of predetermined diametral and axial extents;
        b. a cylindrical outer portion, tapering at one axial end and, at an annular step thereof, into a generally conical portion merging into an outer annular end surface substantially perpendicular to and abutting an outer end of said body cylindrical bore portion; and c. said cylindrical outer portion, at another axial end thereof, merging into an annular outer end surface, the latter having an inner circular edge defining the maximum diametral extent of a formed, bowl-shaped, open, annular recess portion, with the minimum diametral extent thereof being defined by a raised annular inner end surface portion, axially recessed relative to said annular outer end surface, with said raised annular inner end surface portion being substantially perpendicular to an abutting inner end of said body cylindrical bore portion; and ii. said generally cylindrical tube member being in permanent physical conjointness with said contoured sleeve member and having:
　a. a predetermined outer diametral extent and a predetermined wall thickness;
　b. a tube member cylindrical portion extending into and through said outer end of said body cylindrical bore portion of said sleeve member;
　c. an upset, radial, integral flange portion on one end thereof and interconnected with said tube member cylindrical portion;
　d. said radial flange portion including an axially outwardly-directed, open, curved, circumferential, radial groove, with an inner surface of said flange portion conforming to and adjoining a complementary surface of said sleeve member bowl-shaped outer recess portion, both axially and radially;
　e. said radial flange portion also having spaced, concentric, annular end surfaces in a substantially parallel plane relationship with said sleeve member annular outer end surface; and
　f. said radial flange portion further including an inner recess portion that envelops said sleeve member raised annular, inner, end surface portion.

2. The hydraulic flange connection of claim 1, wherein said diametral extent of said body cylindrical bore portion and said tube member outer diametral extent are selected so as permit a slip-fit assembly therebetween.

3. The hydraulic flange connection of claim 1, wherein said concentric annular end surfaces of said sleeve member flange portion are substantially coplanar with said sleeve member annular outer end surface.

4. The hydraulic flange connection of claim 1, wherein said sleeve member bore portion further includes a blind, generally circumferential undercut, extending axially inwardly, for a predetermined extent, from said outer end of said sleeve member axial bore portion.

5. The hydraulic flange connection of claim 4, wherein said tube member cylindrical portion further includes a raised, generally cylindrical, rib portion of a predetermined axial extent.

6. The hydraulic flange connection of claim 5, wherein radial extents and said axial extents of said blind undercut and said raised cylindrical rib portion are substantially similar, with said rib portion being received within said undercut, thereby, in concert with said inner recess portion of said flange portion, at least axially retaining said sleeve member on said tube member.

7. A mechanical flange connection for use between pressurized hydraulic system components having a generally cylindrical tube member in physical conjointness with a contoured sleeve member, said conjointness including:

i. said contoured sleeve member having:
　a. a body portion including an axial cylindrical bore;
　b. a cylindrical outer portion, tapering at one axial end into a generally frustoconical portion abutting one end of said cylindrical bore;
　c. said cylindrical outer portion, at another axial end thereof, merging into an annular outer end surface having an inner circular edge defining an outer diameter of a formed, bowl-shaped, open, annular recess portion having an inner diameter defined by a raised annular inner end surface portion, axially recessed, relative to said annular outer end surface, with said raised annular inner end surface portion abutting another end of said cylindrical bore; and ii. said generally cylindrical tube member being in physical conjointness with said contoured sleeve member and having;
　a. a predetermined outer diameter and a predetermined wall thickness;
　b. a tube member cylindrical portion extending into one end and through said cylindrical bore;
　c. a radial, integral flange portion, at one end of said tube member cylindrical portion;
　d. said radial flange portion including an axially outwardly-directed, openly curved, circumferential radial groove, with an inner surface of said flange portion conforming axially and radially with an abutting complementary surface of said sleeve member bowl-shaped outer recess portion in a nesting relationship; and
　e. said radial flange portion also including an inner recess portion enveloping said sleeve member raised annular, inner, end surface portion.

8. The mechanical flange connection of claim 7, wherein said radial flange portion further includes spaced, concentric, annular end surfaces in substantially parallel plane relationships with said sleeve member annular outer end surface.

9. The mechanical flange connection of claim 7, wherein said sleeve member bore further includes a blind, circumferential, radial undercut, extending axially inwardly for a predetermined extent.

10. The mechanical flange connection of claim 9, wherein said tube member cylindrical portion further includes a raised, radial, generally cylindrical boss portion of a predetermined axial extent.

11. The mechanical flange connection of claim 10, wherein said undercut and boss portion radial as well as axial extents are similar thereby permitting nesting therebetween and at least axially retaining said sleeve member on said tube member.

12. The mechanical flange connection of claim 7, wherein said conjointness between said generally cylindrical tube member and said contoured sleeve member is produced via the process of:
　a. slip-fitting said tube and sleeve member together into an assembly, with said sleeve member surrounding said tube member;
　b. extending a predetermined length said tube member from said inner end of said sleeve member cylindrical bore;
　c. fixedly securing said assembly in a clamp die mechanism; and
　d. forming, with at least one forming step, via at least one movable punch, said extending sleeve member length into said integral flange portion and nesting same with said sleeve member bowl-shaped outer recess portion.

13. The product-by-process of claim 12, wherein said forming step includes multiple sequences.

14. The product-by-process of claim 12, wherein said process further includes pre-shaping a portion of said tube member, corresponding to said extending sleeve member length, into an outwardly tapering shape, prior to said slip-fit assembly of said tube and sleeve members.

15. The product-by-process of claim 13, wherein said process further includes pre-shaping a portion of said tube member, so as produce, on an outer peripheral surface portion thereof, a raised, generally cylindrical boss portion of a predetermined axial extent, prior to said slip-fit assembly of said tube and sleeve members.

16. The product-by-process of claim 15, wherein said process includes the additional sub-step of confining said raised cylindrical boss portion within a blind, generally circumferential, recess within said sleeve member, with said recess extending axially inwardly, for a predetermined extent, from said outer end of said sleeve member axial bore portion, as a part of said slip-fit assembly of said tube and sleeve members.

* * * * *